US006656317B2

(12) United States Patent
Hudson

(10) Patent No.: US 6,656,317 B2
(45) Date of Patent: Dec. 2, 2003

(54) METHOD FOR INSULATING ELECTRICAL WINDINGS

(75) Inventor: Jeffrey A. Hudson, Greer, SC (US)

(73) Assignee: Reliance Electric Technologies, LLC, Mayfield Heights, OH (US)

(*) Notice: Subject to any disclaimer, the term of this patent is extended or adjusted under 35 U.S.C. 154(b) by 0 days.

(21) Appl. No.: 09/967,021

(22) Filed: Sep. 28, 2001

(65) Prior Publication Data
US 2003/0062189 A1 Apr. 3, 2003

(51) Int. Cl.⁷ .............................................. B32B 31/00
(52) U.S. Cl. .................... 156/294; 156/52; 156/173; 156/303.1; 174/120 R; 174/167
(58) Field of Search ............................. 156/47, 51, 52, 156/53, 54, 56, 173, 293, 294, 303.1; 174/110 R, 120 R, 120 SR, 167; 310/45, 340

(56) References Cited

U.S. PATENT DOCUMENTS

| 758,986 A | * | 5/1904 | Locke | 174/162 |
|---|---|---|---|---|
| 3,617,617 A | * | 11/1971 | Katz | 174/120 SR |
| 3,676,579 A | * | 7/1972 | Lanoue et al. | 174/138 R |
| 3,801,392 A | * | 4/1974 | Scheel et al. | 156/51 |
| 4,197,348 A | * | 4/1980 | Townsend | 428/377 |
| 4,601,931 A | * | 7/1986 | Doyle et al. | 428/34.2 |
| 4,900,879 A | * | 2/1990 | Buck et al. | 174/120 R |

FOREIGN PATENT DOCUMENTS

EP        455212 A2 * 11/1991 ............ H01B/7/02

* cited by examiner

Primary Examiner—Michael W. Ball
Assistant Examiner—John L. Goff
(74) Attorney, Agent, or Firm—Patrick S. Yoder; Alexander M. Gerasimow; William R. Walbrun

(57) ABSTRACT

A technique and system for insulating conductors is provided in which insulating tubes are formed by winding insulating tape on a mandrel, with two or more layers of tape being wound in the same or opposite helical directions. The layers are bonded to one another and multiple tubes are formed in a series which can be nestingly assembled. The tubes are selected based upon the insulation rating desired and the size of a conductor. The tubes are assembled on the conductor and bonded to one another and to the conductor.

32 Claims, 4 Drawing Sheets

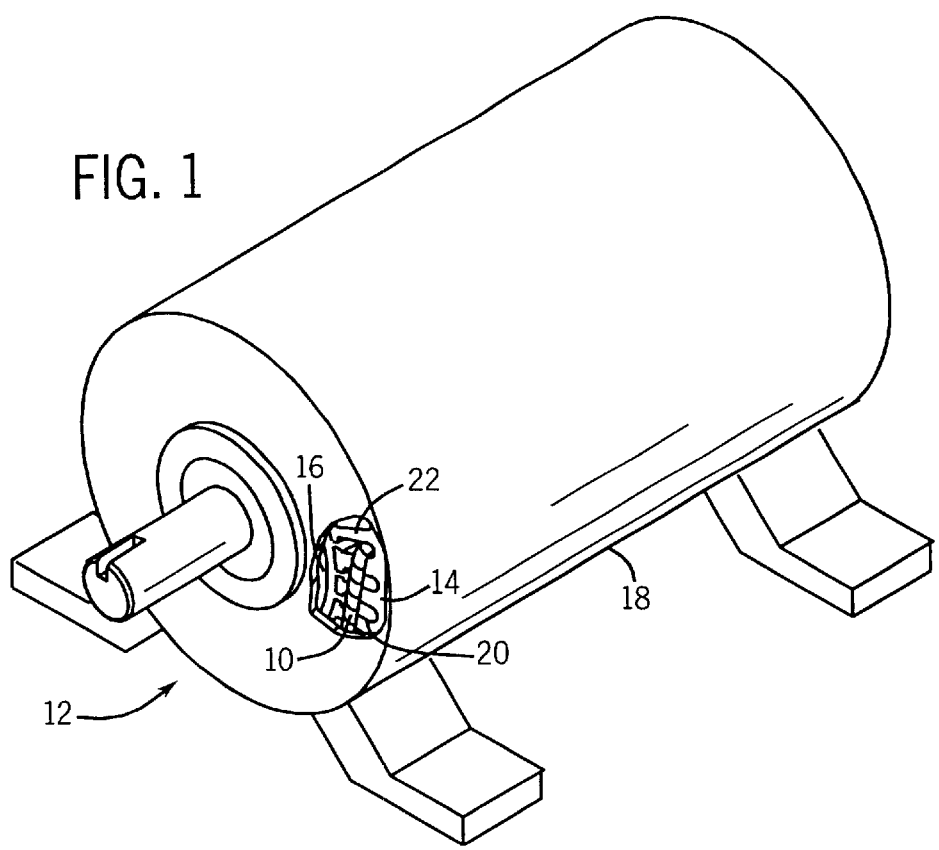
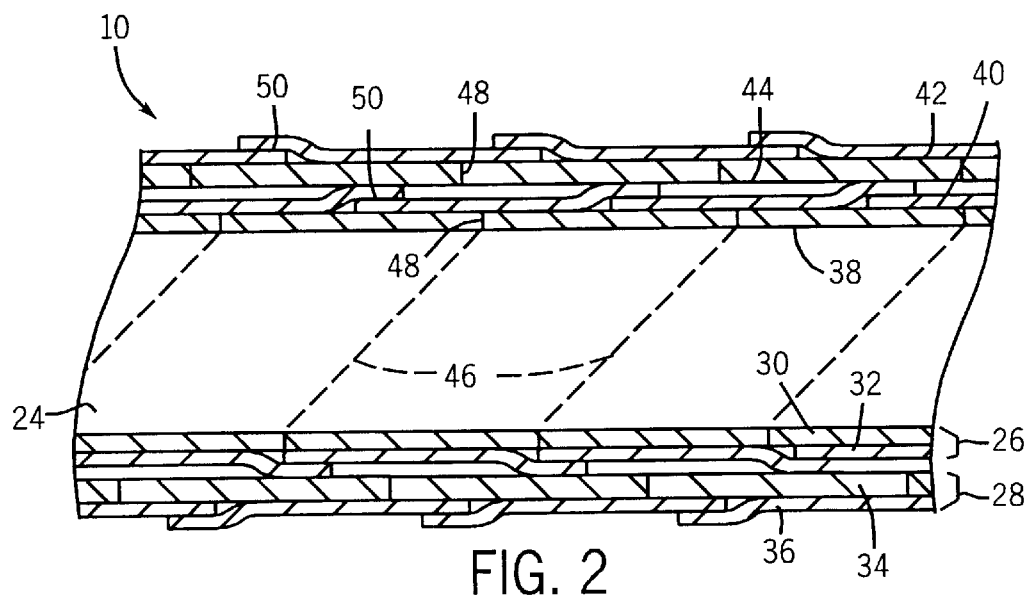

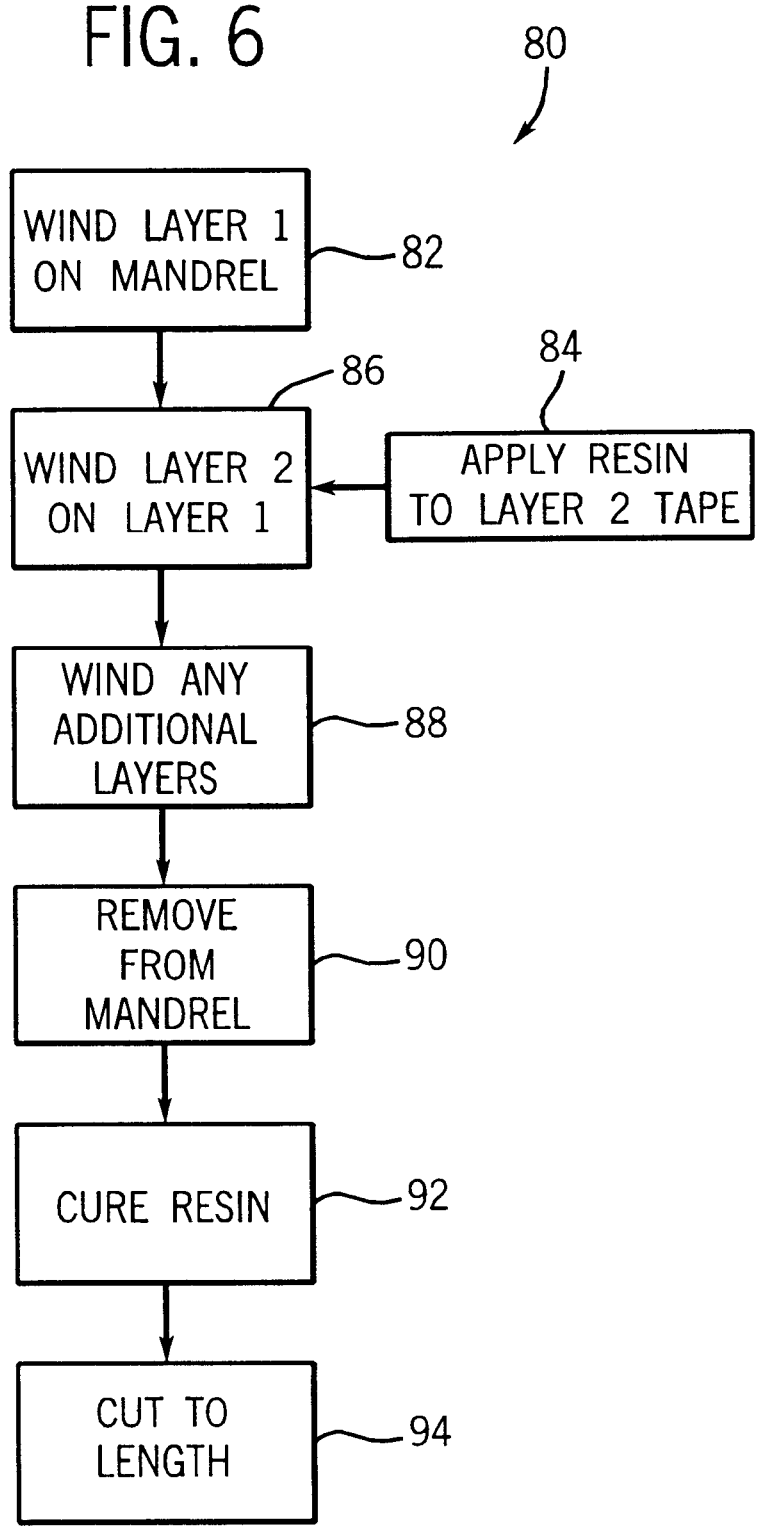

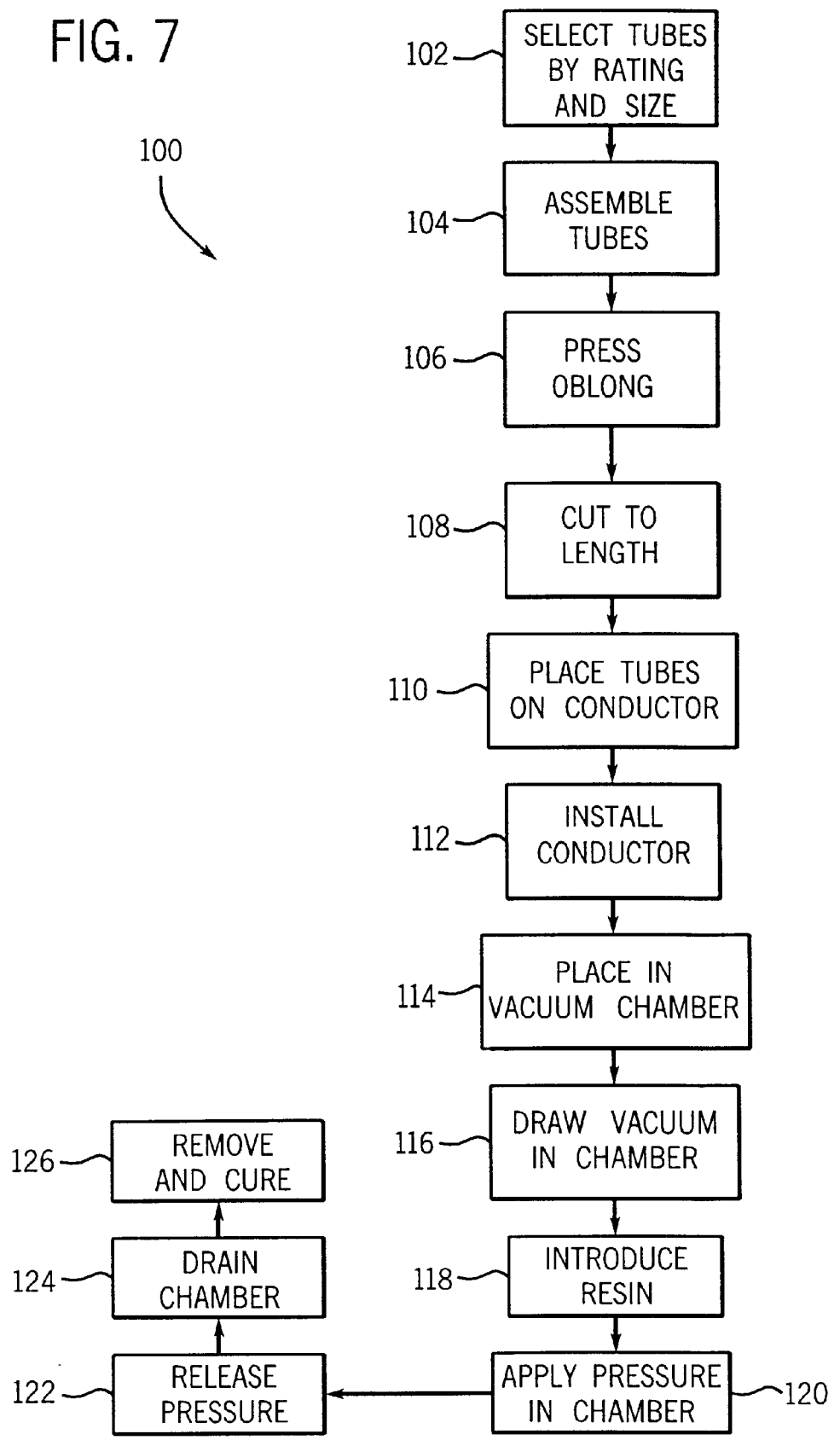

METHOD FOR INSULATING ELECTRICAL WINDINGS

BACKGROUND OF THE INVENTION

The present invention relates generally to the field of electrical insulating systems. More particularly, the invention relates to a novel technique for insulating conductors, such as windings in electric motors and similar machines.

Many applications exist for electrical conductors and insulating systems for such conductors. Insulating systems typically vary widely in configuration and application, depending upon such factors as the voltage levels of the applications, anticipated current loads, constraints and concerns regarding installation, and so forth. In insulating systems for conductors such as those found in windings of electric motors, generators, dynamos, and similar machines, both manual and semi-automated insulation techniques have been proposed and are presently in use.

In electric motor winding environments, for example, conductors are electrically insulated from one another, typically at ends of a stator or rotor. Where possible, pre-assembled or prefabricated insulators may be applied to the conductors, such as in the form of sleeves or bonded tape. Where higher voltage ratings are needed, multiple layers of the insulators may be employed. The layers typically include resin disposed between the multiple layers, rendering the sleeves relatively stiff and resistant to bending. While such stiffness may not pose significant problems for certain applications, other applications, particularly for larger conductors, result in breakage, cracking, and other degradation of the insulation sleeves.

In many applications, the degradation of insulation can lead to significant drawbacks and even premature damage or failure of the associated conductors and machine. In general, it is advantageous to provide the optimal dielectric path between the conductor and surrounding conductors to optimize the insulation capabilities. However, where cracks or breaks occur in the insulating sleeves, new paths are defined which will typically be less optimal then the original paths provided by the insulating material.

In addition to the foregoing drawbacks, conventional insulating systems may require expensive hand taping, or costly materials. Known insulating sleeves such as mylar, aramid fibers, silicon and acrylics, for example, are used only to limited satisfaction. Acrylics, for example, can be expensive and may not be suitable for higher voltages. Silicone sleeves suffer from drawbacks including a limited ability to provide sealing against water penetration.

There is, therefore, a need at present for an improved insulating system for conductors which addresses such drawbacks. There is, at present, a particular need for an insulating system which can be adapted for a variety of voltage ratings and conductor sizes, while providing flexibility during the assembly process to avoid cracking or breaking of the insulation material.

SUMMARY OF THE INVENTION

The present invention provides an insulating system designed to respond to such needs. The system may be used in a wide variety of settings, and is particularly well-suited to insulation of conductors in environments such as electric motors, generators, dynamos, and other electrical machines. The technique can be adapted for a range of voltage ratings and conductor sizes. The technique also avoids or limits the potential for cracking or breaking of insulating sleeves as they are applied to conductors, and may eliminate the need for hand taping in higher voltage applications such as electric motors.

In accordance with certain aspects of the technique, multi-layer insulating sleeves or tubes are developed in which a tape or similar insulating material is wound on a mandrel. The layers of insulating material may be "butt lapped" or provided with zero percent overlap, while other layers within the tubes may include some degree of overlap. The tubes may be formed in a series or family, permitting multiple tubes to be prefabricated and selected depending upon the overall voltage rating of the insulation. Tubes in the series may be nested or slid within one another to provide the desired rating. While the layers of the tubes are bonded to one another, tubes in the system are not bonded to one another during installation. Rather, the tubes are installed on a conductor while permitting mutual displacement of one tube with respect to another to avoid damage, cracking or breakage of the various tubes. Following installation on the conductor, the tubes may be bonded to one another and to the conductor.

Where a family of tubes are provided in a system, adjacent sizes of tubes may include windings in opposite directions. Thus, dielectric paths through the resulting nested tubes are optimized and maximized to enhance the insulation capabilities of the overall assembly.

The construction of the individual tubes may follow right-hand helical winding or left-hand helical winding. Various layers of the tube may be wound in the same helical direction, or may be wound in opposite helical directions. Again, however, when the overall system is assembled with two or more tubes, at least some layers of the system preferably include oppositely-wound tape. Once the system is prefabricated, the present technique provides for cutting, assembly, installation and bonding of the insulation tubes to the conductor for final processing of the conductor and machine.

BRIEF DESCRIPTION OF THE DRAWINGS

The foregoing and other advantages and features of the invention will become apparent upon reading the following detailed description and upon reference to the drawings in which:

FIG. 1 is a prospective view of an exemplary electrical machine in the form of an electric motor having a winding insulated in accordance with aspects of the present technique;

FIG. 2 is a partial elevational view of a conductor having a pair of insulating tubes installed thereon in accordance with aspects of the present technique;

FIG. 6 is a flow chart illustrating exemplary steps for forming multi-layer insulating tubes in accordance with aspects of the present technique; and FIG. 7 is a flow chart illustrating exemplary steps in a process for insulating a conductor in a machine such as an electric motor, in accordance with other aspects of the technique.

DETAILED DESCRIPTION OF SPECIFIC EMBODIMENTS

Figure 3:
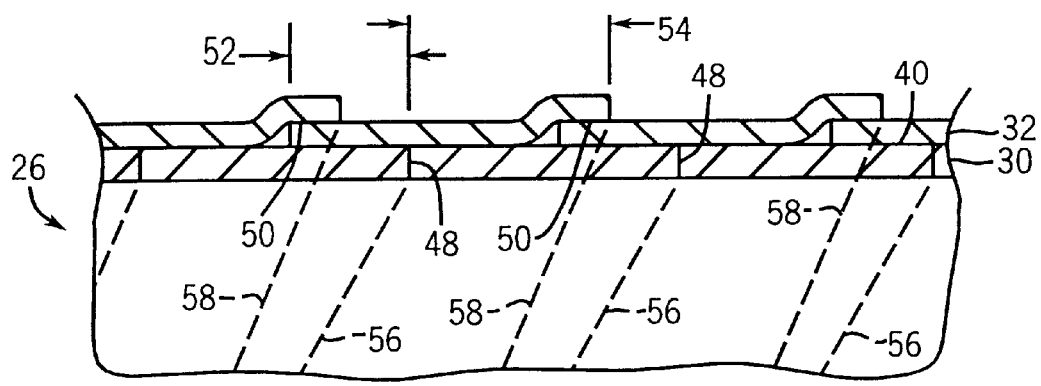
FIG. 3 is a sectional view through a portion of an insulating tube having two layers wound in the same helical direction.

Returning now to the drawings, and referring first to FIG. 1, an insulated conductor 10 is shown which incorporates aspects of the present technique. The conductor 10 is located in an electric motor 12, shown generally diagrammatically in FIG. 1. As will be appreciated by those skilled in the art, in environments such as motors, generators, dynamos, and other electrical machinery, such conductors may be provided in a stator 14 within which a rotor 16 is held for rotation. The motor 12 in the embodiment illustrated in FIG. 1 includes a housing 18 which supports both the stator and rotor. The insulated conductor 10 is disposed in one of a plurality of slots 20 within the stator. The conductor exits an end 22 of the stator 14 and, when grouped with other such conductors in the stator, would define a desired number of pales, groups of windings, and so forth. A single insulated conductor 10 is illustrated in FIG. 1 for illustrative purposes only. In practice, the number and types of conductors would vary according to the number of slots, poles, and the particular winding configuration of the machine.

The insulated conductor 10, incorporating insulation in accordance with aspects of the present technique is illustrated in greater detail in FIG. 2. As shown in FIG. 2, the insulated conductor 10 has a base or substrate conductor 24 which may be a bar of conductive material, or a plurality wires or conductors grouped in a cable or wire bundle. The system illustrated in FIG. 2 includes a first tube, identified generally by reference numeral 26, and a second tube 28 disposed over the first tube 26. Each insulating tube 26 and 28, in the illustrated embodiment, comprises a pair of layers of insulating material, including a base layer 30 of the first tube 26, over which a second layer 32 is disposed. Similarly, outer insulating tube 28 includes a base layer 34 and a second layer 36 disposed over layer 34.

As shown in FIG. 2, and as described in greater detail below, in the final assembly shown, the two insulating tubes 26 and 28 are bonded to one another and to the conductor 24, and the layers of each tube are similarly bonded to one another. Thus, at an interface 38 between insulating tube 26 and conductor 24, a cured resinous bonding material, or the like, will be provided to adhere the insulation system to the conductor and to provide the desired dielectric for the resulting system. Similarly, interfaces between the layers of each tube, as indicated at reference numerals 40 and 42, will be bonded to form the tubes prior to assembly as described below. Finally, an interface 44 between tubes 26 and 28 is similarly bonded during the final assembly and insulation process.

The assembled system illustrated in FIG. 2 includes helically wound insulating materials or tapes forming the tubes 26 and 28. In the embodiment illustrated in FIG. 2, a single helical wind line or joint 46 is shown for the first layer 30 of the inner insulating tube 26. As described more fully below, similar helical joints will be formed for the other layers of the system. It should be noted, however, that the present system provides for extensive and overlapping paths defining circuitous routes through the various insulation layers, thereby enhancing the overall dielectric of the system. In the case of base layers 30 and 34 of insulating tubes 26 and 28, a butt or 0% overlap joint is formed between layers of insulating tape. Layers 32 and 36 of the tubes, however, provide for overlapping abutment. As noted below, various alternative overlapping and non-overlapping techniques may be used in the system.

FIG. 3 illustrates an exemplary construction for an insulating tube 26 and used in the system shown in FIG. 2. As illustrated in FIG. 3, the base layer 30 presents a 0% overlap joint, as noted at reference numeral 48. An overlap joint 50 is provided in the overlying layer 32. Both layer 30 and 32 may be made of any suitable material, such as an aramid fiber, or any other suitable material. Such materials are commercially available from DuPont under the designation Nomex 418. Other suitable materials may include acrylics, silicones, mylar, and so forth.

Layer 30 is wound so as to provide for close abutment, but without overlap, of successive winds of the materials or tape of which the layer is formed. The resulting structure provides a continuous and helical butt joint 56. Layer 32 is formed, preferably by offsetting the overlapping joints 50 from joints 48, and winding the tape or material forming layer 32 over layer 30. Thus, a second continuous and helical joint 58 is formed for layer 32 which is offset from joint 56 of base layer 30. The tape comprising layer 32 is wrapped offset from joints 50 by a dimension 52, such as one half of the width of the material forming layer 30. Thus, a complementary offset dimension 54 is provided between joints 50 and an opposite edge of the material comprising layer 32.

As shown in FIG. 3, various dimensions and relationships may be provided between the tapes and joints formed in each insulating tube. In the embodiment shown in FIG. 3, for example, a tape made of an aramid fiber is wound to form layer 30, with the material having a width of approximately 1.0". Layer 32 is then formed of a material having a slightly greater width, on the order of 1.125". Tolerances for the overlap joints 50 may be set to ensure overlap, or to provide for a little or even no overlap. In a present embodiment, an overlap tolerance of 0.125", −0", +0.0625" is used. Other dimensions and relationships may, of course, be employed depending upon the dielectric paths desired, and the types and sizes of the insulating tapes used to form each tube. Layer 32 is preferably bonded to layer 30 as the layers are formed in a winding station, as described below. Any suitable bonding material may be employed for this purpose, such as an acrylic resin. However, no bonding material is applied along the inner surface of layer 30, so as to permit the free movement of the tubes in the insulating system during installation as described below.

Figure 4:
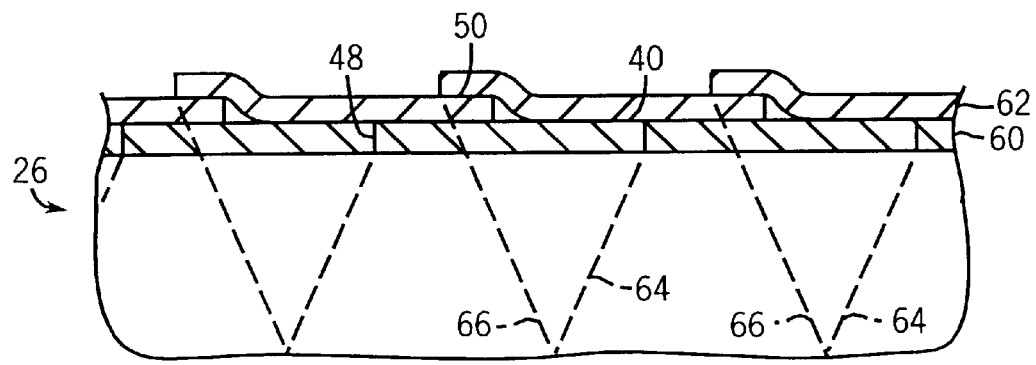
FIG. 4 is a sectional view of a portion of an insulating tube having two layers wound in opposite helical directions.

Within each insulating tube, layers of insulating tape may be laid in opposite helical wind directions. FIG. 4 represents an insulating tube 26 wound in accordance with such techniques. As shown in FIG. 4, a base layer 60 may be wound in a first helical direction, such as to include a 0% overlap joint as discussed above. Helical winds or joints 64 are thus defined at locations where the insulating tape wraps abut one another in layer 60. A subsequent layer 62 may then be disposed over layer 60 in an opposite helical direction to define circuitous dielectric paths of continuous and oppositely oriented helical joints 66. In the embodiment illustrated in FIG. 4, as in the previous embodiment, an overlapping joint 50 is provided in layer 62. Also, a bonding material is provided at interface 40 to secure the insulating material in a pre-assembled tube form.

Figure 5:
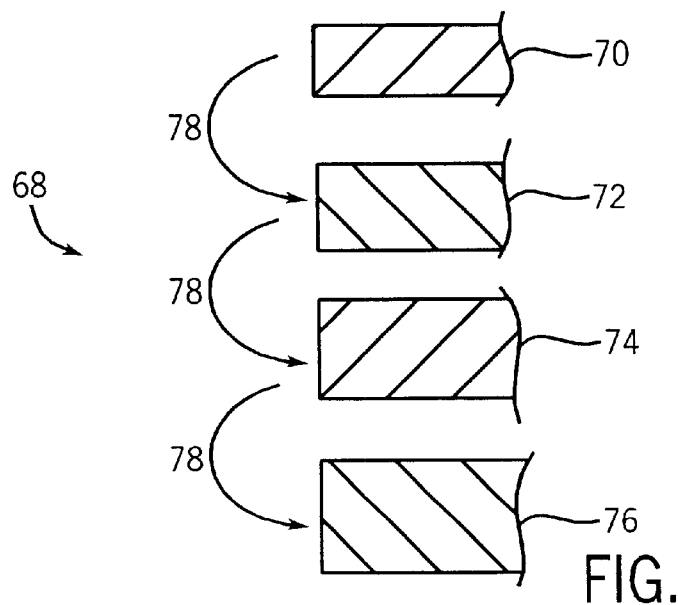
FIG. 5 is a diagrammatical representation of insulating tubes in accordance with the present technique making up a portion of a family for nested assembly on a conductor.

With tubes formed as described above, the present technique offers a system for insulating conductors. It has been found that for pre-assembled insulation systems including multiple insulating layers, cracking, breaking, and other degradation of the insulating material may occur during the installation on a conductor or during bending or other connection of the conductor in a final application. The present technique offers a series or family of pre-assembled tubes which are free to be nested and displaced with respect to one another during installation, thereby avoiding cracking and damage to the insulating materials prior to final positioning. FIG. 5 illustrates an insulating system, designated generally by reference numeral 68, including such a series of pre-assembled insulating tubes. In the embodiment illustrated in FIG. 5, insulating tubes 70, 72, 74, 76, and so forth, are provided having progressively greater inner and outer diameters. In the present embodiment, each tube is assembled of two or more insulating layers as described above. Moreover, each successive tube may be nestingly inserted within an adjacent tube in the series as indicated by arrows 78 in FIG. 5. Any number of such tubes may be designed and pre-assembled in the system, with some 15 tubes being available in the present embodiment.

As also illustrated in FIG. 5, in a preferred embodiment, each adjacent insulating tube in the series of tubes comprising system 68 includes at least one layer wound in a direction opposite to the direction of winding of a layer in immediately adjacent (larger or smaller) tubes in a series. Thus, for a series including tubes N, N+1, N+2, and so forth, tubes N, N+2, N+4, and so forth will be wound in a first helical direction, whereas tubes N+1, N+3, N+5, and so forth will be wound in an opposite helical direction. It should be noted, however, that each tube may include layers wound, themselves, in opposite helical directions. When nested within one another, then, the tubes will provide circuitous dielectric paths by virtue not only of the multiple layers and offsets of layers within each tube, but also owing to the opposite helical winding direction of each successive tube in the stack or assembly.

System 68 also provides for selection and assembly of multiple pre-assembled insulating tubes based upon the particular demands of an application. In particular, it is presently contemplated that the tubes will be selected based upon factors such as their individual insulating ratings, the overall voltage rating desired of the insulation, and the size of the underlying conductor. By way of example, in a present embodiment, a line-to-line voltage rating of 4,460 volts is afforded by two different combinations of helically-wound, two-layer nested insulating tubes, denoted tubes 1, 2, 3 and 4, and tubes 7, 8, 9 and 10 of the system. The selection of the tubes nested in this manner thus depends on the voltage rating and the size of the underlying insulator. Similarly, a line-to-line voltage rating of 6,600 volts is obtained by stacking of six pre-assembled tubes, denoted 1, 2, 3, 4 and 5, or 3, 4, 5, 6, 7 and 8 in the overall system, depending upon the size of the underlying conductor. Again, the number and configuration of the tubes may be different in specific applications depending upon such factors as the inherent insulating capability of the tube material, the style of overlap used to construct the tubes, and so forth.

FIGS. 6 and 7 represent exemplary steps and processes for preforming and applying the insulating tubes of the system described above. FIG. 6 illustrates a process 80 for forming the individual tubes of the system. The process begins at step 82 where the first or base layer of the tube is wound on a mandrel. The tube can be made of any suitable material, such as an aramid fiber, and is wound on the mandrel by rotation of the mandrel or, in the present embodiment, by rotation of a tape dispenser about the mandrel. The first layer may be wound with overlap or with 0% overlap, and is preferably wound on the mandrel with no bonding agent provided on either side of the tape. A second layer is then wound on the first layer as indicated at step 86, with the second layer having had a resin applied to its underside as indicated at step 84. Again, the resin used to bond the layers may be of any suitable type, such as an acrylic resin. Also, as noted above, the second layer may be provided with no overlap or with a degree of overlap depending upon the desired configuration of the tube. As also noted above, the helical joints of the first and second layers are preferably offset with respect to one another and may be disposed in opposite helical directions. Moreover, the helical direction of winding of each successive tube in the series is preferably such that the successive tubes in the series include at least one layer wound in an opposite direction as compared to a layer of adjacent tubes in the series.

At step 88 of FIG. 6, any additional layers may be wound over the layer wound at step 86. Any additional layers would preferably include a resin deposited on a lower side thereof to enhance adherence to the underlying layers as well as to provide some degree of rigidity to the assembly. At step 90 the wound tube is removed from the mandrel. At step 92 the resin is cured to provide some degree of stiffness to the tube. The assembled and cured tube may be pressed or ironed to flatten the tube, as described below. Finally, at step 94 the tubes are cut to a desired length. While the previous assembly steps may be done continuously, at step 94 the tubes may be cut to a relatively long processing length, such as four feet.

The tubes, as pre-assembled in accordance with the process outlined in FIG. 6 are employed in the system is outlined in FIG. 7. The selection and installation process, designated generally by reference numeral 100, begins with the selection of the tubes by insulation rating and size as indicated at step 102. As noted above, once the tubes are pre-assembled in the desired series, two or more tubes may be selected such that the tubes nest within one another and provide an overall insulation rating, typically in volts. The tubes are also selected so that the innermost tube can be slid or positioned on the conductor. At step 104 the tubes are assembled within one another. At step 106, the tubes are pressed along to facilitate assembly within one another and on the conductor. At step 108 the assembled tubes are cut to the desired length. At step 110 the tubes are placed on the conductor and positioned at a desired location. At step 112 the conductor is installed or positioned. It should be noted that in steps 110 and 112 some mutual displacement of the tubes in the assembly with respect with one another may take place. Thus, as a conductor is bent or curved in an application, the insulating tubes are free to bend at different bend radii, thereby avoiding or minimizing degradation of the individual tubes, cracking, breaking, and so forth, The assembled tubes and conductor can be final processed in any suitable manner. In the process 100 outlined in FIG. 7, for example, the entire assembly is vacuum pressure insulated to bond the individual tubes to one another and to the conductor. In this process, the assembled conductor or machine (such as a stator in an electric motor) is positioned in a vacuum chamber (step 114) and a vacuum is drawn within the chamber as indicated at step 116. At step 118 a resin, such as an acrylic resin, is introduced into the chamber at a level sufficient to cover the assembly. At step 120 pressure is applied to the chamber, such as at 90 pounds per square inch. The vacuum drawn at step 116 and the pressure applied at step 120 forces the resin to be drawn into and compressed within the individual interstices of the insulating tubes and at the interface between the insulating tubes and the conductor. At step 122 the pressure is released. At step 124 the vacuum chamber is drained. Finally, at step 126 the article is removed and the resin is cured. In the resulting structure, tight bonding between the conductor and the innermost tube and between the successive tubes in the assembly is developed and maintained.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for insulating an electrical conductor, the method comprising:
   assembling at least two tubular insulators by inserting a first insulator within a second insulator;
   positioning the assembled insulators on an electrical conductor;
   repositioning the assembled insulators and the electrical conductor into their final position allowing the assembled insulators to displace relative to one another and to the conductor during the repositioning; and
   then bonding the first and second insulators to one another and to the conductor.

2. The method of claim 1, further comprising fabricating the first and second insulators, each of the insulators including at least two layers of helically wound tape.

3. The method of claim 2, wherein the at least two layers of helically wound tape are bonded to one another.

4. The method of claim 2, wherein a first layer of helically wound tape is wound with no overlap between adjacent wraps, and a second layer of helically wound tape is wound with overlaps between adjacent wraps.

5. The method of claim 2, wherein a first layer of helically wound tape is wound in a first direction and a second layer of helically wound tape is wound in a second direction opposite to the first direction.

6. The method of claim 2, wherein the first insulator includes a layer of helically wound tape wound in a first direction and the second insulator includes a layer of helically wound tape wound in a second direction opposite to the first direction.

7. The method of claim 1, wherein the first and second insulators are bonded to one another and to the conductor by a vacuum insulating technique.

8. The method of claim 7, wherein the first and second insulators are bonded to one another and to the conductor by resin.

9. The method of claim 1, farther comprising selecting the at least two insulators from a series of at least three insulators based upon a desired voltage rating and a size of the conductor.

10. A method of insulating a conductor, the method comprising:
    selecting at least two insulators from a series of insulators based upon a desired voltage rating and a size of a conductor, each insulator including at least two layers of helically wound insulating material;
    assembling the at least two insulators on the conductor wherein the at least two insulators are selected such that a first insulators coaxially within a second insulator;
    positioning the assembled insulators and the electrical conductor into their final position allowing the assembled insulators to displace relative to one another and to the conductor during the positioning; and
    then bonding the at least two insulators to one another and to the conductor.

11. The method of claim 10, wherein the first insulator is assembled within the second insulator prior to assembly of the insulators on the conductor.

12. The method of claim 10, further comprising fabricating first and second insulators, each of the insulators including at least two layers of helically wound insulating material.

13. The method of claim 12, wherein the at least two layers of helically wound insulating material are bonded to one another prior to bonding of the insulating layers to one another and to the conductor.

14. The method of claim 12, wherein a first layer of helically wound insulating material is wound with no overlap between adjacent wraps, and a second layer of helically wound insulating material is wound with overlaps between adjacent wraps.

15. The method of claim 12, wherein a first layer of helically wound insulating material is wound in a first direction and a second layer of helically wound insulating material is wound in a second direction opposite to the first direction.

16. The method of claim 12, wherein the first insulator includes a layer of helically wound insulating material wound in a first direction and the second insulator includes a layer of helically wound insulating material wound in a second direction opposite to the first direction.

17. The method of claim 10, wherein the first and second insulators are bonded to one another and to the conductor by a vacuum insulating technique.

18. The method of claim 17, wherein the first and second insulators are bonded to one another and to the conductor by resin.

19. A method for insulating a conductor, the method comprising:
    providing a series of insulating tubes, each insulating tube in the series being sized to coaxially nest with an adjacent tube in the series, each insulating tube including at least first and second layers of helically wound insulating tape;
    selecting at least first and second insulating tubes from the series of insulating tubes based upon a desired voltage rating and a size of a conductor to be insulated;
    assembling the first and second insulating tubes coaxially on the conductor;
    positioning the assembled insulating tubes and the electrical conductor into their final position allowing the assembled insulating tubes to displace relative to one another and to the conductor during the positioning; and
    then bonding the at least two insulating tubes to one another and to the conductor.

20. The method of claim 19, wherein the first and second insulating tubes are assembled coaxially with one another prior to assembly on the conductor.

21. The method of claim 19, wherein each odd insulting tube (N, N+2, N+3, . . . ) in the series includes a layer of helically wound insulating tape wound in a first direction, and each even insulating tube (N+1, N+3, N+5, . . . ) in the series includes a layer of helically wound insulating tape wound in a second direction opposite to the first direction.

22. The method of claim 19, wherein the layers of each insulating tube one prior to assembly of the first and second insulating tubes on the conductor.

23. A method for insulating a conductor, the method comprising:
    providing a series of insulating tubes, each insulating tube in the series being sized to coaxially nest with an adjacent tube in the series, each odd insulting tube (N, N+2, N+4, . . . ) in the series including a layer of helically wound insulating tape wound in a first direction, and each even insulating tube (N+1, N+3, N+5, . . . ) in the series including a layer of helically wound insulating tape wound in a second direction opposite to the first direction;

selecting at least first and second insulating tubes from the series of insulating tubes based upon a desired voltage rating and a size of a conductor to be insulated;

assembling the first and second insulating tubes coaxially on the conductor;

positioning the assembled insulating tubes and the electrical conductor into their final position allowing the assembled insulating tubes to displace relative to one another and to the conductor during the positioning; and then bonding the at least two insulating tubes to one another and to the conductor.

24. The method of claim 23, wherein each of the insulating tubes is fabricated by winding at least two layers of insulting tape on a mandrel, removing the tube from the mandrel, bonding layers to one another, and cutting the tube to a desired length.

25. The method of claim 23, wherein the first and second insulating tubes are assembled coaxially with one another prior to assembly on the conductor.

26. The method of claim 23, wherein the layers of each insulating tube are bonded to one another prior to assembly of the first and second insulating tubes on the conductor.

27. The method of claim 23, wherein within each insulting tube of the series, a first layer of helically wound insulating tape is wound with no overlap between adjacent wraps, and a second layer of helically wound insulating tape is wound with overlaps between adjacent wraps.

28. The method of claim 23, wherein within each insulating tube, a first layer of helically wound insulating tape is wound in a first direction and a second layer of helically wound insulating tape is wound in a second direction opposite to the first direction.

29. A method for making a system for insulating a conductor, the method comprising:

fabricating a series of insulating tubes, each insulating tube in the series being sized to coaxially nest with an adjacent tube in the series, each odd insulting tube (N, N+2, N+4, . . . ) in the series including a layer of helically wound insulating tape wound in a first direction, and each even insulating tube (N+1, N+3, N+5, . . . ) in the series including a layer of helically wound insulating tape wound in a second direction opposite to the first direction, each insulating tube being fabricated by the steps of:

winding at least first and second layers of helically wound insulting tape on a mandrel;
removing the tube from the mandrel,
bonding layers to one another, and
cutting the tube to a desired length; and selecting at least two insulating tubes from the series of insulating tubes based upon a desired voltage rating and a size of a conductor, each insulating tube including at least two layers of helically wound insulating material;

assembling the at least two insulating tubes on the conductor wherein the at least two insulating tubes are selected such that a first insulating tube fits coaxially within a second insulating tube;

positioning the assembled insulating tubes and the electrical conductor into their final position allowing the assembled insulating tubes to displace relative to one another and to the conductor during the positioning; and then bonding the at least two insulating tubes to one another and to the conductor.

30. The method of claim 29, wherein the first and second layers of helically wound insulating tape of each insulating tube are wound in opposite directions.

31. The system of claim 29, wherein within each insulting tube of the series, the first layer of helically wound insulating tape is wound with no overlap between adjacent wraps, and the second layer of helically wound insulating tape is wound with overlaps between adjacent wraps.

32. The system of claim 29, wherein within each insulating tube of the series, the first layer of helically wound insulating tape is wound in a first direction and the second layer of helically wound insulating tape is wound in a second direction opposite to the first direction.

* * * * *